(12) United States Patent
Piccin

(10) Patent No.: US 9,045,642 B2
(45) Date of Patent: Jun. 2, 2015

(54) MANUFACTURING A COMPOSITE MATERIAL COMPRISING LIGNOCELLULOSIC FIBERS IN A PLASTIC MATRIX

(71) Applicant: Faurecia Interieur Industrie, Nanterre (FR)

(72) Inventor: Hugo Piccin, München (DE)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/691,118

(22) Filed: Nov. 30, 2012

(65) Prior Publication Data

US 2013/0137798 A1    May 30, 2013

(30) Foreign Application Priority Data

Nov. 30, 2011    (FR) ..................... 11 60978

(51) Int. Cl.
| | |
|---|---|
| *C08L 97/02* | (2006.01) |
| *B27N 1/00* | (2006.01) |
| *C08J 5/06* | (2006.01) |
| *C08L 23/04* | (2006.01) |
| *C08L 23/10* | (2006.01) |

(52) U.S. Cl.
CPC . *C08L 97/02* (2013.01); *B27N 1/00* (2013.01); *C08J 5/06* (2013.01); *C08L 23/04* (2013.01); *C08L 23/10* (2013.01)

(58) Field of Classification Search
CPC ....................................... C08L 97/02
USPC ........................................ 524/35
See application file for complete search history.

(56) References Cited

U.S. PATENT DOCUMENTS

| | | | |
|---|---|---|---|
| 4,822,826 A | 4/1989 | Pommier et al. | |
| 5,341,580 A * | 8/1994 | Teal | ................................ 34/446 |
| 5,451,361 A | 9/1995 | Ruyter et al. | |
| 5,678,324 A * | 10/1997 | Viitaniemi et al. | ............. 34/396 |
| 7,100,303 B2 * | 9/2006 | Bernon et al. | .................. 34/225 |
| 2003/0064238 A1 | 4/2003 | Hasegawa | |
| 2004/0112465 A1* | 6/2004 | Jones | ............................ 144/329 |
| 2005/0116377 A1 | 6/2005 | Hasegawa | |

FOREIGN PATENT DOCUMENTS

| | | |
|---|---|---|
| EP | 0260183 | 3/1988 |
| EP | 0622163 | 11/1994 |
| EP | 1297933 | 4/2003 |
| WO | WO 9500423 A1 * | 1/1995 |
| WO | WO 2007056839 A1 * | 5/2007 |

OTHER PUBLICATIONS

Screw Conveyer Catalog & Engineering Manual, Screw Conveyor Corporation, Catalog No. 787E, 2010, pp. 1-64.*
FR Search Report for FR 1160978 dated Aug. 1, 2012, 2 pages.
FR Written Opinion for FR 1160978 dated Aug. 1, 2012, 4 pages (not translated).

* cited by examiner

*Primary Examiner* — Liam J Heincer
*Assistant Examiner* — Nicholas Hill
(74) *Attorney, Agent, or Firm* — Reising Ethington P.C.

(57) ABSTRACT

A manufacturing method includes the steps of providing lignocellulosic fibers, providing a plastic material, and mixing the lignocellulosic fibers and the plastic material to obtain a composite material. The manufacturing method also includes, prior to the mixing step, a step for heat treatment of the lignocellulosic fibers wherein the lignocellulosic fibers are heated.

8 Claims, 2 Drawing Sheets

MANUFACTURING A COMPOSITE MATERIAL COMPRISING LIGNOCELLULOSIC FIBERS IN A PLASTIC MATRIX

TECHNICAL FIELD

The present invention relates to the field of composite materials comprising plastic material reinforced with lignocellulosic fibers.

BACKGROUND

WO2007/056839 discloses such a composite material comprising lignocellulosic fibers arranged in a thermoplastic matrix.

Such composite materials are sensitive to humidity.

One of the objects of the invention is to propose a manufacturing method with which a composite material may be obtained, comprising lignocellulosic fibers, which is not very sensitive to humidity.

SUMMARY

In accordance with an embodiment of the invention, there is provided a method for manufacturing a composite material comprising lignocellulosic fibers in a matrix in plastic material. The method includes the steps of: providing lignocellulosic fibers; providing the plastic material; and mixing the lignocellulosic fibers and the plastic material in order to obtain the composite material, wherein the method includes, prior to the mixing step, a step for heat treatment of lignocellulosic fibers, in which the lignocellulosic fibers are heated.

According to other embodiments, the method comprises one or more of the following features, taken individually or according to all technically possible combinations;

in the heat treatment step, the lignocellulosic fibers are heated to a temperature above 160° C.;
in the heat treatment step, the lignocellulosic fibers are heated to a temperature directly proportional to the oxygen deficiency of an enclosure for heating the lignocellulosic fibers;
the lignocellulosic fibers are defibrillated in such a way in order to generate fibrils from lignocellulosic fibers before the heat treatment step;
in the heat treatment step, the heated lignocellulosic fibers are then cooled actively;
the step for providing lignocellulosic fibers comprises a step for refining a source of lignocellulosic fibers in order to obtain the lignocellulosic fibers;
the lignocellulosic fibers are defibrillated during the refining step so as to generate fibrils from the lignocellulosic fibers.

In accordance with another embodiment of the invention, there is provided a composite material obtained according to a method as defined above.

In accordance with yet another embodiment of the invention, there is provided a vehicle part, notably a motor vehicle part, formed at least partly with a composite material obtained according to a method as defined above.

BRIEF DESCRIPTION OF THE DRAWINGS

Embodiments of the invention and advantages thereof will be better understood upon reading the description which follows, only given as an example and made with reference to the appended drawings wherein.

DETAILED DESCRIPTION OF THE ILLUSTRATED EMBODIMENT(S)

Figure 1:
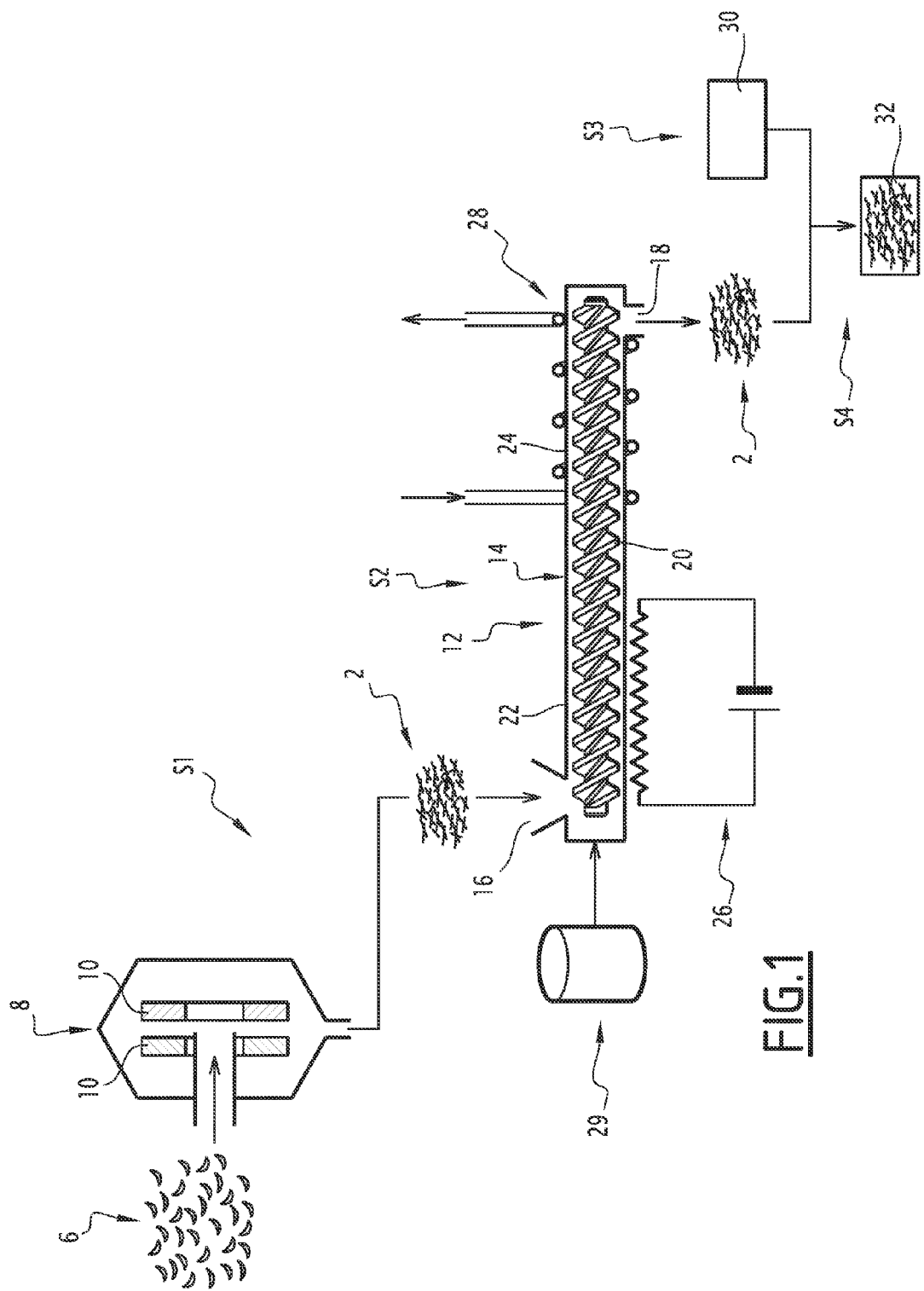
FIG. 1 is a schematic view of a method for manufacturing a composite material comprising lignocellulosic fibers in a matrix in plastic material, according to the invention.

The method illustrated in FIG. 1 allows manufacturing of a composite material comprising lignocellulosic fibers in a matrix in plastic material.

This method comprises:
a step S1 for providing the lignocellulosic fibers 2,
a step S2 for heat treatment of the lignocellulosic fibers 2,
a step S3 for providing a plastic material 4, and
a step S4 for mixing the heat-treated lignocellulosic fibers 2 and the plastic material 4 in order to obtain a composite material.

Lignocellulosic fibers 2 may be obtained from diverse sources such as wood, plants or textile products obtained from lignocellulosic fibers or a combination of sources. Lignocellulosic fibers 2 may for example be provided as a paper slurry obtained from these sources and also called pulp. Lignocellulosic fibers 2 may be provided as virgin paper pulp, either scrapped or recycled or as a combination of such paper pulps.

Lignocellulosic fibers 2 may be obtained as a paper pulp in a known way by mechanical treatment (or refining), chemical treatment or a combination of such treatments.

As illustrated in FIG. 1, lignocellulosic fibers 2 are obtained by refining wood fragments 6, for example wood chips, in a refiner 8 with disks comprising two counter-rotating parallel disks 10, the wood fragments 6 being inserted between both disks 10 and cut between both disks 10 so as to separate the lignocellulosic fibers 2 from the wood fragments 6.

Lignocellulosic fibers 2 are recovered at the outlet of the refiner 8 as a paper pulp.

Refining is a mechanical treatment of the source of lignocellulosic fibers. Lignocellulosic fibers may be obtained by other types of treatment, for example a chemical treatment, or a combination of a chemical treatment and of a mechanical treatment.

Preferably, the lignocellulosic fibers 2 are defibrillated so as to generate fibrils. Fibrils designate lignocellulosic microfibers making up the lignocellulosic fibers 2. During defibrillation, the fibrils remain attached to the lignocellulosic fibers 2 or are detached from the lignocellulosic fibers.

Advantageously, lignocellulosic fibers 2 are defibrillated during refining. Defibrillation of lignocellulosic fibers 2 depends on refining parameters, notably the refining time, the refining temperature, the shearing generated during refining, the amount of wood fragments loaded into the refiner 8.

The refining step and the defibrillation step are thus carried out simultaneously. Alternatively, the refining step and the defibrillation step are carried out sequentially, for example by achieving two consecutive refinings with different refining parameters.

In the subsequent description, unless specified otherwise, the expression "lignocellulosic fibers" designates lignocellulosic fibers 2 and the possible fibrils generated by defibrillation.

Lignocellulosic fibers either defibrillated or not may alternatively be provided from other sources of lignocellulosic fibers. The method according to the invention may be applied starting with commercial paper pulp comprising defibrillated lignocellulosic fibers.

Lignocellulosic fibers 2 are provided as a paper pulp having a low hygrometry level, notably a hygrometry level of less than 10%, in particular a hygrometry level of the order of 7%.

During the heat treatment step, the lignocellulosic fibers 2 are heated under an oxygen ($O_2$)-deficient controlled atmosphere in a heating enclosure.

The heating temperature is adapted according to the oxygen ($O_2$) deficiency of the heating enclosure. The more the atmosphere of the heating enclosure will be deficient in oxygen, the higher may be the heating temperature. The heating temperature is directly proportional to the oxygen deficiency of the heating enclosure for lignocellulosic fibers.

Lignocellulosic fibers 2 are heated so as to reduce the sugar level of lignocellulosic fibers and to close the cells of lignocellulosic fibers.

Removal of sugar decreases the sensitivity of lignocellulosic fibers 2 to bacteria. The closing of the cells of lignocellulosic fibers 2 prevents water from entering the lignocellulosic fibers 2 by reducing the hygrometric sensitivity of lignocellulosic fibers.

Lignocellulosic fibers 2 are heated to a temperature above 160° C., or to a temperature above 250° C., or further to a temperature above 300° C., or else to a temperature above 400° C.

The lignocellulosic fibers 2 are heated so that the lignocellulosic fibers 2 actually reach such a temperature.

By heating the lignocellulosic fibers under an oxygen ($O_2$)-deficient atmosphere, combustion of the lignocellulosic fibers, in particular defibrillated lignocellulosic fibers is avoided. Indeed, because of defibrillation, the major part of the lignin and hemicellulose surrounding the lignocellulosic fibers and the fibrils has been removed, so that the combustion temperature of the thereby exposed lignocellulosic fibers and fibrils, is very low. The heating of lignocellulosic fibers and fibrils to a high temperature entails a high risk of combustion. This risk is decreased by removing oxygen during the heating.

Lignocellulosic fibers 2 are for example heated under an atmosphere rich in nitrogen ($N_2$) or in carbon dioxide ($CO_2$).

Lignocellulosic fibers are cooled under an oxygen ($O_2$)-deficient controlled atmosphere. Lignocellulosic fibers are cooled so as to return to a temperature below the combustion temperature of lignocellulosic fibers and of fibrils.

Lignocellulosic fibers are cooled actively. By active cooling, is meant that the lignocellulosic fibers are subject to the action of a cooling device able to extract calories from lignocellulosic fibers heated beforehand.

Active cooling gives the possibility of bringing back lignocellulosic fibers 2 to a temperature below the combustion temperature within a reduced period of time compatible with industrial production, all the more so if the oxygen ($O_2$)-deficient atmosphere is maintained during cooling.

As illustrated in FIG. 1, the lignocellulosic fibers 2 are heat-treated in a continuous heat treatment device 12. The term "continuous" means that the heat treatment device 12 is designed so as to continuously receive at the inlet, lignocellulosic fibers 2 to be treated and to continuously provide at the outlet, heat-treated lignocellulosic fibers 2.

The heat treatment device 12 comprises an elongated enclosure 14 comprising an inlet 16 for introducing the lignocellulosic fibers 2 to be treated and an outlet 18 for extracting the treated lignocellulosic fibers 2.

The heat treatment device 12 comprises a conveyance device 20 for conveying the lignocellulosic fibers 2 continuously from the inlet 16 to the outlet 18. The conveyance device 20 is a worm screw here.

The enclosure 14 successively comprises from the inlet 16 to the outlet 18, a first heating segment 22 and a second cooling segment 24.

The heat treatment device 12 comprises a heating device 26 for heating the first segment 22 and a cooling device 28 for cooling the second segment 24.

The heating device 26 is of any suitable type for actively heating the first segment 22 so as to heat the lignocellulosic fibers 2 up to the desired temperature. The heating device 26 is for example an electric device and comprises electric resistors for generating heat. Alternatively, the heating device operates by combustion, for example by combustion of gas, and comprises burners.

The cooling device 28 is of any suitable type for actively cooling the second segment 24 so as to bring the lignocellulosic fibers back to a temperature below the combustion temperature in oxygen before their exit 18. The cooling device 28 for example comprises a cooling circuit by circulation of a heat transfer fluid such as water. The cooling device may alternatively comprise a refrigeration circuit operating by compression and expansion of a coolant fluid, and heat exchange between the second segment and the expansed coolant fluid.

The heat treatment device 12 comprises an atmosphere control device 29 suitable for maintaining an oxygen-deficient controlled atmosphere in the enclosure 14.

In the step for providing a plastic material, a plastic material 30 is provided. The plastic material is for example a commercial plastic material.

The plastic material may be a thermosetting material or a thermoplastic material.

Suitable thermosetting plastic materials notably comprise polyester, acrylic polymer, melamine.

Suitable thermoplastic plastic materials notably comprise polyamide (PA), polypropylene (PP), polyethylene (PE), polylactic acid (PLA), polybutylene succinate (PBS), le polytrimethylene terephthalate (PTT), acrylonitrile-butadiene-styrene (ABS) and acrylonitrile-butadiene-styrene polycarbonate (ABS-PC).

In the mixing step, the lignocellulosic fibers 2 heat treated beforehand are mixed with the molten plastic material 30 so as to obtain a composite material 32 comprising lignocellulosic fibers in a matrix of plastic material. Mixing is carried out for example by mechanical mixing in a mixer.

The thereby obtained composite material 32 may be used for manufacturing parts according to conventional manufacturing methods known per se to one skilled in the art, notably injection molding, thermoforming, etc.

Figure 2:
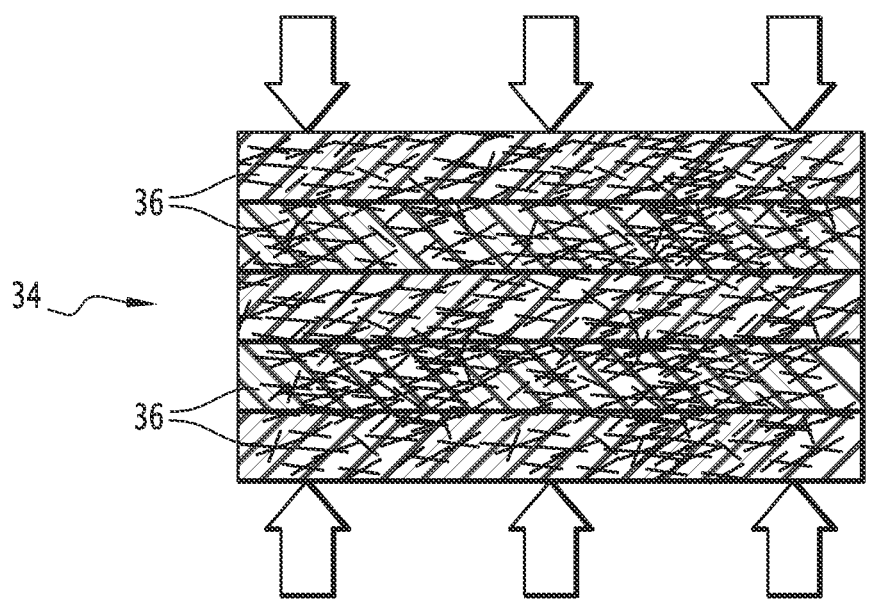
FIG. 2 is a schematic view illustrating the manufacturing of a part by means of the composite material.

As illustrated in FIG. 2, the composite material comprising lignocellulosic fibers in a matrix in a thermosetting material allows a part 34 to be manufactured by superposition of composite material layers 36, by compression of various layers 36 and by baking for hardening the thermosetting plastic material.

The obtained composite material has satisfactory mechanical properties, in particular in the case when the lignocellulosic fibers are defibrillated, because the presence of fibrils either detached or not increases the contact surface area between the plastic material and the lignocellulosic fibers. Because of the heat treatment of the lignocellulosic fibers, the composite material is not very sensitive to bacteria and to humidity.

The composite material may be used for manufacturing parts in various technical fields, notably in the automotive, aerospace, electronic and goods production industry. The composite material is in particular suitable for manufacturing vehicle parts, notably motor vehicle parts. The composite material is suitable for manufacturing structural parts or decorative parts.

The invention claimed is:

1. A method for manufacturing a composite material comprising lignocellulosic fibers in a matrix in plastic material, comprising steps for:
providing lignocellulosic fibers;
providing the plastic material; and
mixing the lignocellulosic fibers and the plastic material for obtaining the composite material,
the method comprising, a step for heat treatment of the lignocellulosic fibers, wherein the lignocellulosic fibers are heated, and a cooling step, wherein the heated lignocellulosic fibers are then cooled actively after the step for heat treatment but before the mixing step,
characterized in that, in the heat treatment step, the lignocellulosic fibers are heated to a temperature above 160° C.,
wherein the heat treatment step and the cooling step are performed in a continuous processing device comprising a first heating segment and a second cooling segment and a cooling device for actively cooling fibers after the second cooling segment,
wherein the cooling device further comprises an enclosure and a conveying device for continuously conveying the fibers from an inlet to an outlet, and
wherein the conveying device is a worm screw .

2. The manufacturing method according to claim 1, wherein, in the heat treatment step, the lignocellulosic fibers are heated to a temperature directly proportional to the oxygen deficiency of an enclosure for heating the lignocellulosic fibers.

3. The manufacturing method according to claim 1, wherein the step for providing lignocellulosic fibers comprises a step for refining a source of lignocellulosic fibers in order to obtain the lignocellulosic fibers.

4. The method according to claim 3, wherein the lignocellulosic fibers are defibrillated during the refining step so as to generate fibrils from the lignocellulosic fibers.

5. The method of claim 1, further comprising use of a heating device for heating fibers in the first heating segment.

6. The method of claim 1, wherein at least a portion of the cooling step is performed in an oxygen-deficient atmosphere.

7. The method of claim 1, wherein, during the heat treatment step, the lignocellulosic fibers are heated under an oxygen-deficient controlled atmosphere. heat treatment step.

8. The method of claim 1, wherein the lignocellulosic fibers are defibrillated so as to generate fibrils from the lignocellulosic fibers before the heat treatment step.

* * * * *